March 28, 1950     A. SELIGMANN     2,501,744

CHECK VALVE

Filed Sept. 12, 1944     4 Sheets-Sheet 1

INVENTOR
Arthur Seligmann
BY
J. B. Felshin
ATTORNEY

March 28, 1950     A. SELIGMANN     2,501,744
CHECK VALVE

Filed Sept. 12, 1944     4 Sheets-Sheet 2

INVENTOR
Arthur Seligmann
BY
J. B. Felshin
ATTORNEY

March 28, 1950     A. SELIGMANN     2,501,744
CHECK VALVE

Filed Sept. 12, 1944     4 Sheets-Sheet 3

INVENTOR
Arthur Seligmann
BY
ATTORNEY

Patented Mar. 28, 1950

2,501,744

UNITED STATES PATENT OFFICE 2,501,744

CHECK VALVE

Arthur Seligmann, Newark, N. J.

Application September 12, 1944, Serial No. 553,681

12 Claims. (Cl. 251—119)

This invention relates to check valves. It is particularly directed to a check valve for gas or other fluids.

One use of the check valve embodying the invention is in the discharge line of a refrigerator compressor for gas, particularly to be used for those plants which have two or more compressors in the refrigerator system. In such systems there is usually a by-pass around the compressor provided with a shut off valve; and a shut off valve is also provided in the discharge line leading to the condenser. When starting the compressor, the shut off valve in the discharge line is closed and the shut off valve in the by-pass is open. After the compressor has reached full speed, the shut off valve in the discharge line is opened and the shut off valve in the by-pass line is closed. There usually is a check valve in the discharge line to prevent the gas at condenser pressure from surging through the by-pass before the shut off valve in the by-pass is fully closed. In large plants where there are large shut-off valves in the by-pass and discharge lines, such valves are hard to control. In systems where four or five compressors are running interconnecting and the shut off valve in the discharge line is opened before the shut off valve in the by-pass is closed, if the check valve does not work properly or if there is no check valve, then the refrigerant such as ammonia or sulfur dioxide from the condenser will flow back into the by-pass and suction line. If another compressor or the same compressor receives the liquid refrigerant in large amounts or at high pressure instead of the gas, then something might give way, as for example, the cylinder head may blow out or the whole system may be put out of order. Check valves in the discharge line, as heretofore made, are normally closed by spring means. For this reason such check valves open and close twice for each compressor revolution. Such repeated opening and closing of check valves, as heretofore constructed, cause them to break quite often. Experience has shown that such check valves break so often that the maintenance men have given up replacing or repairing them and often employ two men for starting the system, one for closing the shut off valve in the by-pass and the other for slowly opening the shut off valve in the discharge line, simultaneously. It is therefore an object of this invention to provide a highly improved check valve which normally stays open as long as the compressor runs and which may close when the compressor stops and which must close when the shut off valves in the discharge and by-pass lines open simultaneously, to prevent a vehement back flow through the by-pass.

Another object of this invention is to provide a check valve of the character described normally biased to open position. Thus the valve will remain open if the pressure on the inlet side drops and the resulting gas flow fluctuates between maximum in one direction and zero. If, however, inlet pressure begins to drop further, the valve will be forced to close as soon as the difference in pressure at the outlet and inlet sides exceeds the tendency of the valve to open.

A further advantage of the invention consists in the following:

For as much as the valve will not move with every piston play, i. e. many times per second, but only at long intervals, there is no objection to a high valve lift, so that a large passage area can easily and inexpensively be provided, which results in a very small pressure drop through the valve.

Furthermore, this large area will always be actually used as the valve is assured to stay open all the way. With the old design, where the spring tends to close the valve, no matter how high the lift is made, the valve will only open to the point where the resulting pressure drop is just sufficient to compensate the spring tension plus the weight of the valve plate. With the present design, full opening of the valve can be obtained.

Yet another object of this invention is to provide in a check valve of the character described, means for using the Pitot principle to produce an additional difference in pressure to aid in closing the valve when a backflow should occur.

Still a further object of this invention is to provide a rugged and durable check valve of the character described which may be used in a refrigerator system, and which has a great variety of other uses, such as in automatically controlled compressor systems, and which shall be relatively inexpensive to manufacture, which shall be sure and positive in operation, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is an axial cross-sectional view through a check valve embodying the invention and showing the valve in closed position;

Figure 2:
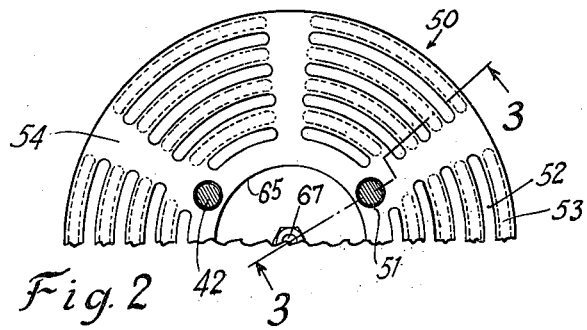
Fig. 2 is a top plan view taken on line 2—2 of Fig. 1.

Referring now in detail to the drawing, 10 designates a check valve embodying the invention interposed between an inlet pipe 11 and an outlet pipe 12. The check valve 10 comprises a pair of symmetrical dome shaped members 14 screwed to pipes 11 and 12, respectively, and formed with apertured flanges 15 interconnected by bolts 16. Flanges 15 are spaced apart as shown in the drawing.

Supported on and between the adjacent faces of flanges 15 of members 14 is a valve seat 20. The valve seat comprises an annular plate, the edges whereof are received between the flanges 15. A pair of top and bottom gaskets 21 may be interposed between member 20 and flanges 15. Thus member 20 is tightly clamped between the members 14 by the bolts 16. Member 20 is formed with a plurality of concentric rows of arcual slots 25 forming arcual ribs 26 between the slots, and radial ribs 27 between the sets of arcual slots and ribs.

Figure 1:
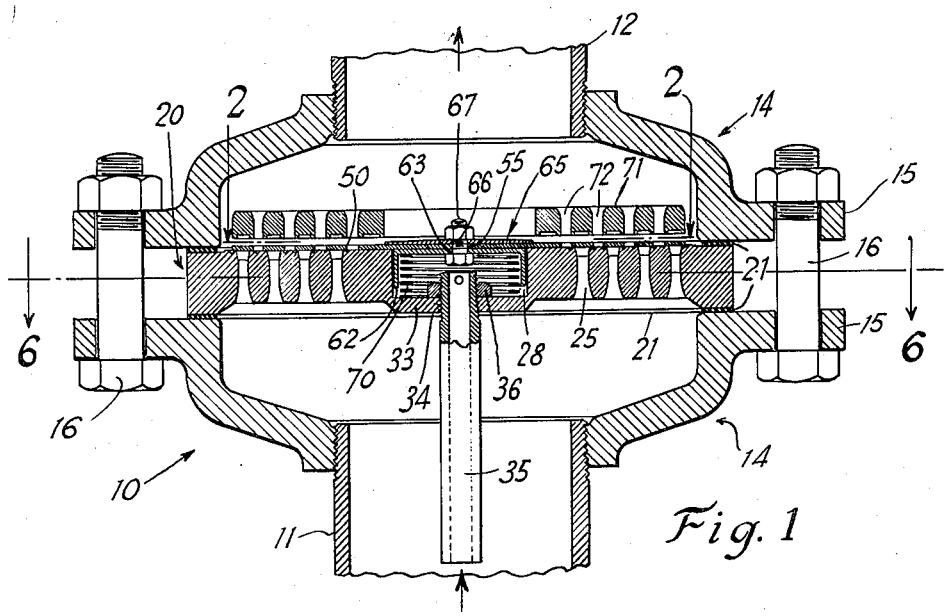

In the upper face of member 20 is a central recess or cylindrical opening 28 terminating short of the bottom surfaces of plate 20. The diameter of opening 28 is considerably less than the diameter of plate 20 as shown in Fig. 1 of the drawing.

Seat 20 is furthermore formed with a plurality of circular through openings 31 equiangularly spaced and located inwardly of the innermost circular row of slots 25. The bottom wall 33 of the cylindrical opening 28 is formed with a central screw threaded opening 34. Screwed within said opening and extending downwardly therefrom is a tube 35 projecting axially into inlet pipe 11. The upper end of the tube may be fixed to wall 33 by means of a nut 36 screwed to the upper end of the tube.

Attached to seat 20 are a plurality of parallel guide bolts 37. The guide bolts pass through openings 31 in plate 20. Each guide bolt 37 is formed with a shank portion 40 passing downwardly through opening 31, and screwed to the lower end of the shank is a nut 41. At the upper end of shank 40 is a collar 42 resting on the upper surface of seat 20. Extending upwardly from collar 42 is a shank portion 43 formed with a screw threaded portion 44 to which is screwed a nut 45 for the purpose hereinafter appearing.

Slidably mounted on the valve seat 20 is a valve plate 50 having openings 51 to slidably receive the collars 42 of bolts 37. Valve plate 50 is considerably thinner than plate 20. It is formed with arcual slots 52 which register with the arcual ribs 26 of plate 20. Said plate 50 is also formed with arcual ribs 53 registering with and overlapping the arcual slots of the valve seat 20, and with radial ribs 54 registering with the radial ribs 27 of said valve seat. Thus, when plate 50 rests on member 20, the slots 25 are closed by the valve plate. Valve plate 50 has a limited up and down movement guided by the bolts 37.

Plate 50 is furthermore formed with a central opening 55 for the purpose hereinafter appearing. Contacting the underside of plate 50 is an inverted cup shaped cylindrical member 60 having a top wall 61 and a downwardly extending cylindrical wall 62. Wall 61 is formed with a central opening 63 registering with opening 55. Wall 61 contacts the underside of plate 50 whereas cylindrical wall 62 projects downwardly into the opening 28 with a rather loose fit.

On top of plate 50 is a retainer plate 65 likewise formed with a central opening 66 registering with openings 55 and 63. Passing through said registering openings is a bolt 67 to fix plate 50 to plate 65 and cup 60.

Within cylindrical opening 28 and interposed between the bottom wall 33 thereof and the underside of wall 61 of cup 60 is a coil compression spring 70. It will be noted that plate 50 may be moved up and down together with cup 60 and plate 55 from the closed position of Fig. 1 to the open position of Fig. 3.

Fixed to the upper ends of bolts 37 is an annular valve guard 71 having substantially the same outer diameter as valve plate 50. The valve guard 71 is formed with arcual slots 72 substantially registering with the slots 52 of valve plate 50. It is formed with openings 74 receiving the upper portions 43 of bolts 37.

Openings 74 of the valve guard 71 are counterbored at the lower ends thereof to receive the upper ends of collars or shoulders 42 of the bolts 37. The nuts 45 serve to clamp the valve guard 71 to the bolts 37 in spaced relation above the valve seat 20.

It will now be understood that when valve plate 50 is down in the position shown in Fig. 1 the valve openings 25 are closed and back flow is prevented. When the valve plate 50 moves upwardly to contact the valve guard, flow in an upward direction is permitted through slots 25, 52 and 72.

It will be noted that the spring 70 normally maintains the valve plate in open position and said valve closes only when the difference between the outlet pressure and inlet pressure multiplied by the area of sleeve or cup 60 exceeds the resultant of the spring tension of spring 70 and weight of plate 50. The sleeve 60 is not fitted absolutely tight in the center hole or opening 28 so as to prevent friction, but has very little clearance so that only a trickle of gas could flow through the gap, and the bottom of the center of the valve plate is held up under the static pressure prevailing at the inlet side of the valve, thus assuring a positive action as the gas flow begins to reverse. If there is any back flow a suction will be created through pipe 35 to produce additional difference of pressure to insure prompt closing of plate 50.

It will be noted that the recess 28 communicates or is open to the inlet side of the valve. In Fig. 1 the communication is through tube 35, In Fig. 4 the bottom wall of the recess is open at 100.

Figure 4:
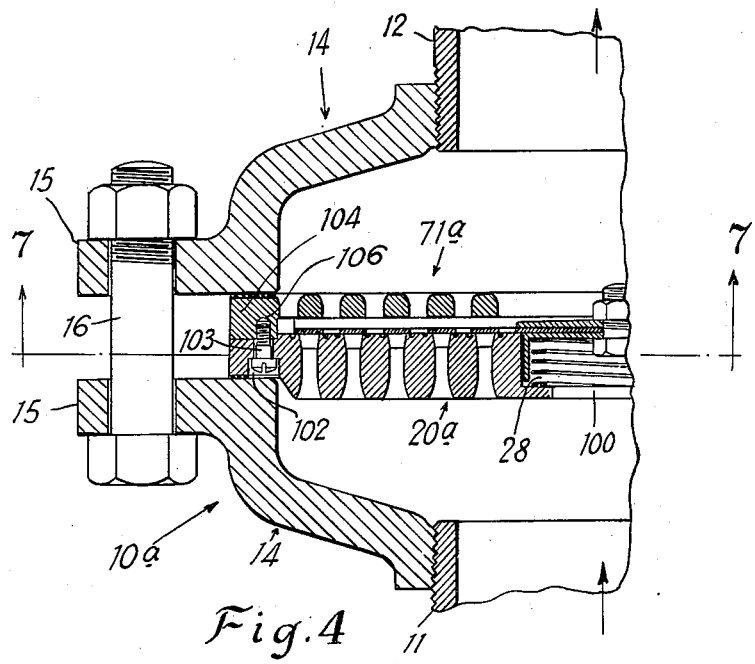
Fig. 4 is a partial view similar to Fig. 1 but showing a modified form of the invention.

It will be noted that in the form of the invention described in Figs. 1 and 4 the check valve is installed in an upwardly flowing line. The spring 70 is of sufficient strength to normally lift valve plate 50 against its weight to open position. Thus the spring 70 must be able to exert greater pressure than the weight of the valve plate 50. The resultant of the spring pressure and weight of the valve plate must be a force tending to open the valve plate and retain it in open position.

Figure 5:
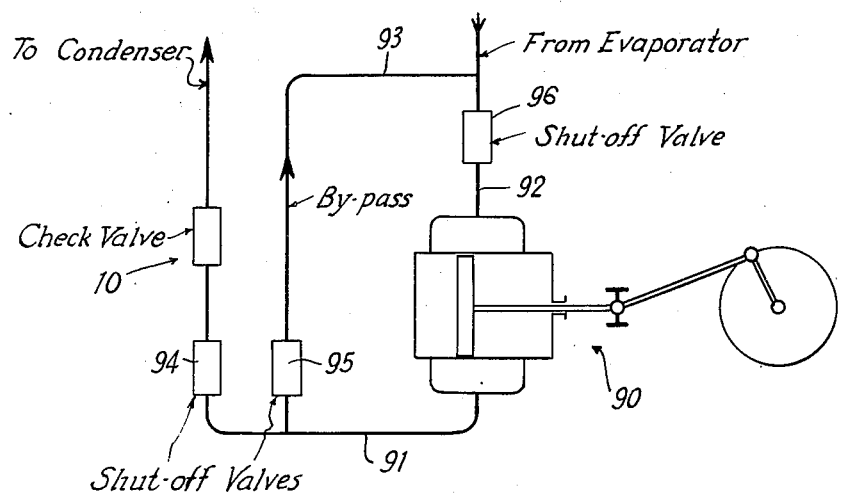
Fig. 5 is a diagrammatic view of part of a refrigerator system and illustrating one application of the check valve embodying the invention.
Figure 6:
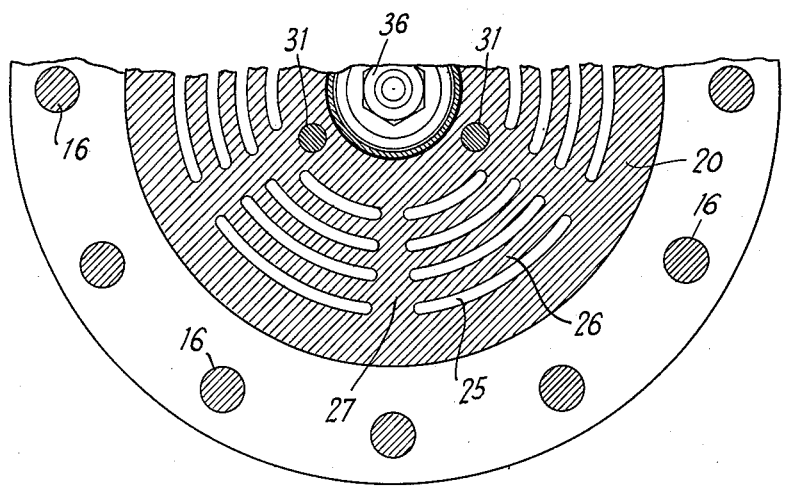
Fig. 6 is a cross-sectional view taken on line 6—6 of Fig. 1.
Figure 7:
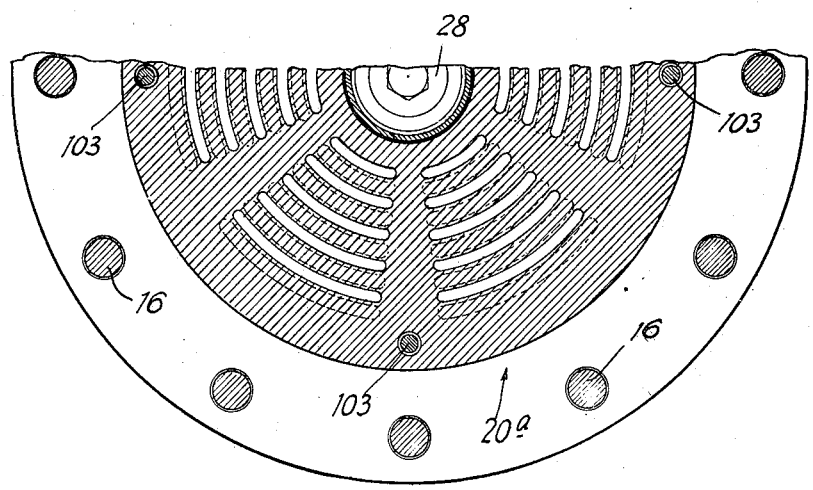
Fig. 7 is a cross-sectional view taken on line 7—7 of Fig. 4.

One use of the valve 10 embodying the invention is illustrated in Fig. 5 of the drawing. In Fig. 5 there is shown diagrammatically part of a refrigerating system including part of a compressor 90 provided with a discharge line 91 on the high pressure side extending to the condenser, and with an inlet line 92 coming from the evaporator. A by-pass line 93 is provided interconnecting the high and low pressure sides of the compressor. Shut off valves 94 and 95 are usually provided in the discharge and by-pass lines. An additional shut-off valve 96 may be provided on the low pressure line 92. When starting, the compressor shut off valve 94 in the discharge line is first closed and shut off valve 95 in the by-pass is opened. After the compressor has reached full speed shut off valve 94 is opened and the check valve in the discharge line prevents gas at condenser pressure from rushing back into the by-pass. Shut off valve 95 in the by-pass line is closed and then pressure in the discharge manifold is built up higher than the condenser pressure which permits the check valve in the discharge line to open and allow gas to pass onto the condenser.

Check valves for the discharge line as heretofore constructed were normally closed by spring pressure. With such a check valve, the valve opens and closes twice for every compressor revolution. Such action often causes breakage of the check valve and sometimes the breakage is so often that operators have given up repairing or replacing them. In the case of breakage or failure of the check valve, and particularly where several compressors are running interconnected the refrigerant from the condenser will flow back into the by-pass and suction lines causing considerable damage.

With the present valve, the valve remains open as long as the compressor runs. The spring of the present valve embodying the invention tends to hold the valve open. Thus it will not move if the pressure drops and the resulting gas flow fluctuates in between maximum and zero in one direction. After the pressure is reversed, however, the valve will be forced closed as soon as the difference between the outlet pressure and the inlet pressure multiplied by the area in the center of the valve exceeds the resultant of the spring tension and weight of plate 50. The present valves are therefore not likely to break or get out of order and will last for a longer period.

In Fig. 4 there is shown a valve 10a embodying the invention and illustrating another form thereof. The valve 10a is similar to valve 10 except that the pipe 35 is omitted and the bottom wall of the cylindrical opening 28 is open as at 100. Furthermore, the valve seat member and valve guard member are interconnected at the periphery instead of by bolts 37. Thus as shown in Fig. 4 the valve seat 20a is formed with openings 102 at its periphery to receive screws 103.

The valve guard 71a is formed with an annular peripheral downwardly extending flange 104 contacting the valve seat and formed with screw openings 106 to receive the screws 103. The valve plate is slidably mounted between the valve seat and valve guard on any suitable guide pins or rods.

In the foregoing it was assumed that the valve is built into an upwardly flowing line. If it is built into a downward line, the weight of the valve plate will tend to open the valve. In this case, especially if for constructive reasons a heavy valve plate has to be provided, it may be advantageous to compensate this weight partially by a spring, i. e. to give the spring a tendency towards the closing of the valve. Always, however, the resultant of spring tension and weight must urge the valve towards the open position. There is nothing to prevent the installation of the valve in a horizontal or slanting line.

Figure 3:
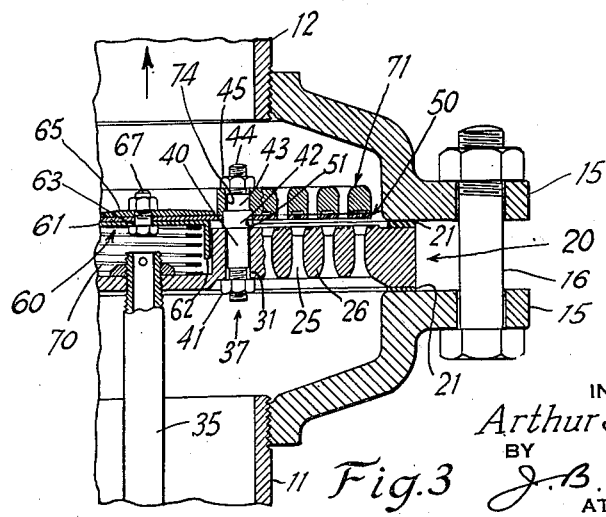
Fig. 3 is a cross-sectional view taken on line 3—3 of Fig. 2, and showing the valve in open position.
Figure 8:
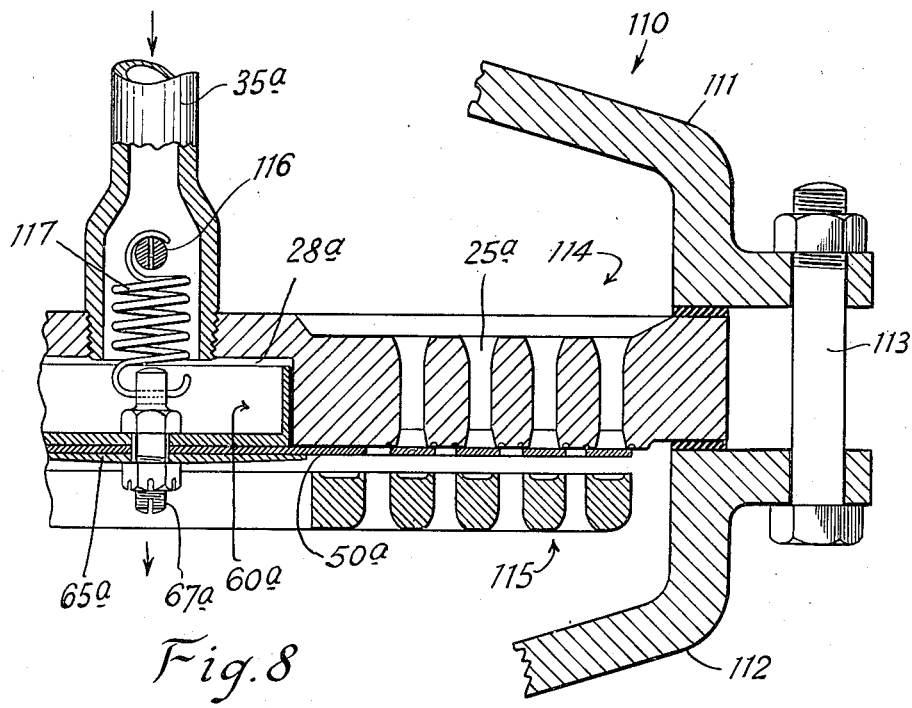
Fig. 8 is a partial axial cross-sectional view of a check valve embodying the invention in a downwardly flowing line.

In Fig. 8 there is shown a check valve 110 embodying the invention built into a downwardly flowing line. In said figure the arrows show the normal direction of flow. The valve comprises a pair of chamber members 111 and 112 bolted together by bolts 113. Clamped between the chamber members 111 and 112 is a valve seat 114 which may be similar to valve seat 20, but mounted in reverse position. The valve seat 114 is likewise formed with a central recess 28a on its underside and is provided with arcual slots 25a similar to slots 25. Attached to valve seat 114 in parallel spaced opposed relation thereto is a valve guard 115. The valve guard may be attached to the valve seat in the same manner as illustrated in Fig. 3 of the drawing. The valve guard is located below the valve seat 114 as shown in Fig. 8. Within the recess 28a is arranged a cup 60a. The gap between the cup and the recess is sufficiently narrow to prevent passage of any considerable amount of fluid.

Attached to cup 60a is a valve plate 50a having slots registering with the slots in the valve guard and alternating with the slots in the valve seat. The valve plate 50a may be attached to the cup by means of a plate 65a and a central bolt 67a. Attached to the top of the valve seat 114 and extending upwardly therefrom is an axial tube 35a communicating with the recess 28a and also with the inlet side of the line. Mounted on tube 35a is a transverse pin 116 connected by a tension spring 117 to bolt 67a. The spring 117 is of such strength that the valve plate 50a is normally open, that is the spring 117 is insufficient to lift the valve plate 50a off the valve guard 115 so that the valve is normally open. The resultant of the weight of the valve plate and the spring tension 117 is such that the valve plate is normally biased downwardly to open position. If desired, the spring 117 may be entirely eliminated so that the weight of the plate alone is relied on to maintain the valve plate in open position. It is only where the valve plate would be too heavy that the spring 117 is employed to lessen or decrease the downward pull of the plate.

Figure 9:
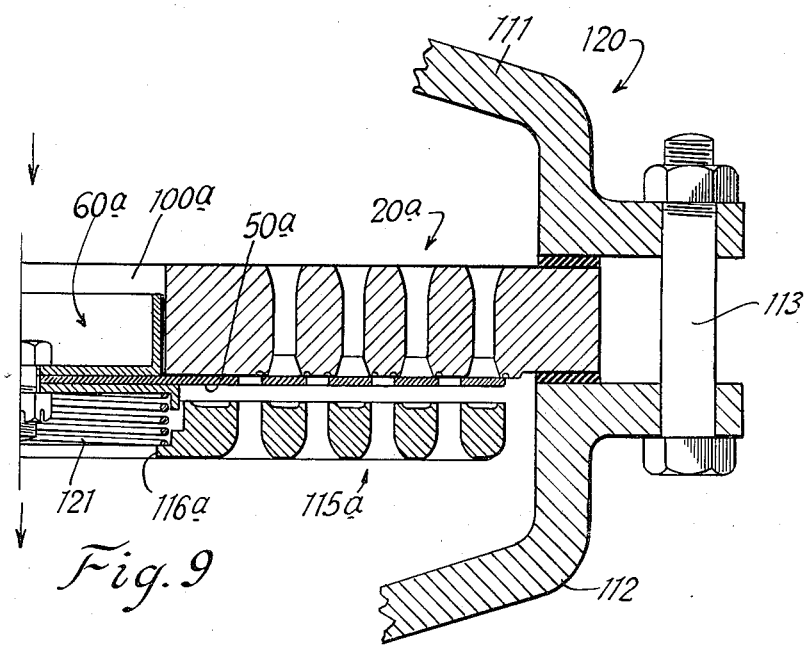
Fig. 9 is a view similar to Fig. 8 and illustrating a modified form of the invention.

In Fig. 9 there is shown a check valve 120 embodying the invention and likewise incorporated into a downwardly flowing line. In valve 120, the tube 35a is omitted and the valve seat 20a is formed with a central opening 100a in which is received cup 60a. A valve guard 115a is fixed to the valve seat in spaced parallel opposed relation thereto as shown in the drawing. Interposed between a shoulder 116a on valve guard 115a and plate 50a is a coil compression spring 121. The weight of the valve plate 50a is sufficient however, to normally overcome the spring 121 so that the valve is normally open. Here likewise the spring may be entirely omitted and reliance may be had for opening of the valve on the weight of the valve plate. Where the valve plate is too heavy, the spring 121 may be employed to lessen the downward pressure of the plate due to its weight. It will be noted that in the valves 110 and 120 the recess communicates with the inlet side of the valve and that the cups 60a have a rather loose fit within said recess of the valve seat.

Important for the invention and essential to the proper function of the valve in all its variations is the following: First, the resultant force of gravity and spring load (if any) must tend to keep the valve fully open; this will avoid full or partial travel (vibrations) with the frequency of the compressor or multiples thereof. Second, in order to absolutely insure the closing of the valve, if and when required, a substantial area of the valve plate covers an opening which is not used for gas passage, but by special means shut off from the flow; thus, this area is exposed to full head pressure on one side, and to full back pressure on the other at all times, not only in the closed position, where this is obvious. Referring to Fig. 3, which shows the valve in open position, the gas in the pipe line and in the inlet chamber, before entering the valve, has a certain pressure; as the velocity is very low here, static pressure and total pressure will be almost identical; now, as the gas enters the slots of the seat it gains velocity and consequently loses pressure; as the stream is then deflected along the underside of the plate, and again deflected into the slots of the guard, further pressure drops occur, and a final decrease of pressure takes place as the gas passes through the guard. Consequently, when the gas reaches its original low velocity again in the exit chamber after leaving the valve, it has undergone a permanent pressure loss. The pressure back of the valve is lower than ahead of it, and the pressure at any point along the gas passage through the valve structure is somewhere in between. It can thus be seen that the pressure differential acting on that part of the valve plate which covers the passage openings in the seat is that created by the deflection of the gas stream around the edges of the slots in the plate, which is obviously less than half the total pressure drop, irrespective of the direction of the flow. However, due to the construction of the valve, particularly due to the snug fit of the cup in the recess, no flow can take place through the central opening, and consequently no change of pressure into velocity and vice versa; this central area of the plate is, therefore, at all times subject to the full pressure differential between inlet and outlet chambers.

Now, if and when the normal gas supply stops and the pressure equalizes, the valve is still kept open by the resultant action of gravity and spring. If the flow reverses, but as long as it remains slow, there is little tendency to close the valve through action on those parts of the plate which lie between the slots, because the pressure differential here is small for the reason explained above, and it may be too little to overcome the spring tension. However, the full pressure differential acts upon the central area of the plate, and this will enforce a closing before a rapid back-flow has an opportunity to develop, which, of course, is the purpose of the valve. After the valve has, thus, closed and the gas flow has completely ceased, the entire plate is, naturally, exposed to the full pressure differential, and, thus, held tightly on the seat as long as the pressure on its upper side exceeds that on its bottom.

The terms "full head pressure" and "full back pressure" as used in the description and the claims mean the pressures prevailing in the gas immediately before it enters and immediately after it leaves the valve resp., as distinguished from intermediate pressures prevailing at points within the valve structure along the passage channels.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In a check valve, a valve seat formed with slots and ribs between the slots, said valve seat being formed with an opening in its upper surface, a valve plate on the valve seat formed with slots registering with said ribs, a spring within said opening and interposed between the valve seat and valve plate, and a valve guard above the valve plate and fixed to the valve seat in spaced relation thereto, said valve guard having slots registering with the slots in the valve plate, and a tube connected to the bottom wall of the opening in the valve seat and communicating therewith and extending downwardly therefrom into the inlet side of the check valve.

2. A check valve comprising a chamber, a valve seat traversing said chamber and formed with valve openings, a valve guard in said chamber, means to fix said valve seat to said valve guard in spaced, parallel relation thereto, a valve plate interposed between said valve seat and valve guard, said valve plate being adapted to close the openings in said valve seat, said valve plate and valve guard having registering openings, means to normally bias the valve plate toward said valve guard, said biasing means being interposed between the valve seat and valve plate, said valve seat being formed with a recess to receive said biasing means, a cup shaped member fixed to said valve plate and loosely projecting into said recess in the valve seat, and a tube fixed to said valve seat and communicating with said recess and projecting into the inlet side of the check valve.

3. A check valve comprising a valve seat, and a valve guard, said valve seat and valve guard being disposed in spaced opposed relation and having non-registering openings, a valve plate disposed between said valve seat and valve guard and having openings registering with the openings in the valve guard and adapted to close the openings in the valve seat, spring means to open the valve plate, the resultant of the weight of the valve plate and the influence of the spring being such that the valve plate and spring means are in approximate equilibrium in fully opened position adjacent the valve guard with no flow, said valve seat being formed with a recess communicating directly with the inlet side of the valve, and a member fixed to the valve plate, projecting into said recess, and fitting into it so snugly as to prevent substantial gas flow through the recess at all positions of the plate.

4. A check valve comprising a valve seat having openings for the passage of fluid and at least one additional opening, a valve plate covering all these openings in the closed position thereof, and uncovering only the passage openings in the open position, spring means counteracting the weight of the plate in such a manner that the plate and spring means are in approximate equilibrium in the fully open position, that part of the valve plate which covers the said additional opening being exposed to the full head pressure on one side and to the full back pressure on the other side in both the open and closed positions of the valve.

5. A check valve comprising a valve seat having openings for the passage of fluid and at least one additional opening, a valve plate covering all these openings in the closed position thereof, and uncovering only the passage openings in the open position, spring means counteracting the weight of the plate in such a manner that the plate and spring means are in approximate equilibrium in the fully open position, that part of the valve plate which covers the said additional opening being exposed to the full head pressure on one side and to the full back pressure on the other side in both the open and closed positions of the valve, and guide means to keep the plate essentially parallel to the seat.

6. A check valve comprising a valve seat having openings for the passage of fluid and at least one additional opening, a valve plate covering all these openings in the closed position thereof, and uncovering only the passage openings in the open position, spring means counteracting the weight of the plate in such a manner that the plate and spring means are in approximate equilibrium in the fully open position, that part of the valve plate which covers the said additional opening being exposed to the full head pressure on one side and to the full back pressure on the other side in both the open and closed positions of the valve, and a guard disposed in spaced opposed relation to the seat, and provided with means limiting the movement of the plate.

7. A check valve comprising a valve seat having openings for the passage of fluid and at least one additional opening, a valve plate covering all these openings in the closed position thereof, and uncovering only the passage openings in the open position, spring means counteracting the weight of the plate in such a manner that the plate and spring means are in approximate equilibrium in the fully open position, that part of the valve plate which covers the said additional opening being exposed to the full head pressure on one side and to the full back pressure on the other side in both the open and closed positions of the valve, and a guard disposed in spaced opposed relation to the seat, and provided with means limiting the movement of the plate, the plate and the guard having openings registering with each other but offset with the openings in the seat, and the guard having at least one further opening opposite the said additional opening of the seat.

8. A check valve comprising a valve seat having openings for the passage of fluid and at least one additional opening, a valve plate covering all these openings in the closed position thereof, and uncovering only the passage openings in the open position, spring means counteracting the weight of the plate in such a manner that the plate and spring means are in approximate equilibrium in the fully open position, that part of the valve plate which covers the said additional opening being exposed to the full head pressure on one side and to the full back pressure on the other side in both the open and closed positions of the valve, a cylindrical part on the plate fitting into the said additional opening of the seat forming a gap therewith and obstructing the flow therethrough.

9. A check valve comprising a valve seat having openings for the passage of fluid and at least one additional opening, a valve plate covering all these openings in the closed position thereof, and uncovering only the passage openings in the open position, spring means counteracting the weight of the plate in such a manner that the plate and spring means are in approximate equilibrium in the fully open position, that part of the valve plate which covers the said additional opening being exposed to the full head pressure on one side and to the full back pressure on the other side in both the open and closed positions of the valve, said spring means being located within the said additional opening, and interposed between the valve seat and valve plate.

10. A check valve comprising a valve seat having openings for the passage of fluid and at least one additional opening, a valve plate covering all these openings in the closed position thereof, and uncovering only the passage openings in the open position, spring means counteracting the weight of the plate in such a manner that the plate and spring means are in approximate equilibrium in the fully open position, that part of the valve plate which covers the said additional opening being exposed to the full head pressure on one side and to the full back pressure on the other side in both the open and closed positions of the valve, the said additional opening being open on the up-stream side.

11. A check valve comprising a valve seat having openings for the passage of fluid and at least one additional opening, a valve plate covering all these openings in the closed position thereof, and uncovering only the passage openings in the open position, spring means counteracting the weight of the plate in such a manner that the plate and spring means are in approximate equilibrium in the fully open position, that part of the valve plate which covers the said additional opening being exposed to the full head pressure on one side and to the full back pressure on the other side in both the open and closed positions of the valve, a cylindrical part on the plate fitting into the said additional opening of the seat forming a gap therewith and obstructing the flow therethrough, the said additional opening being connected to a point further up-stream by a conduit whose cross section is many times the area of the gap.

12. In a valve, a valve seat having valve openings, a valve plate therefor adapted to close said openings in closed position of the valve plate and to open said openings in its open position, said valve seat having an additional opening, spring means counteracting the weight of the plate in such a manner that the plate and spring means are in approximate equilibrium in the fully open position, said valve plate having a portion closing said additional opening when the valve is closed, and means to retain said additional opening substantially closed when the valve is open whereby to expose said portion of said valve plate to full head pressure on one side and full back pressure on its other side in all positions of said valve plate.

ARTHUR SELIGMANN.

REFERENCES CITED

The following references are of record in the file of this patent:

UNITED STATES PATENTS

| Number | Name | Date |
|---|---|---|
| 793,214 | Neuhaus | June 27, 1905 |
| 852,589 | Weir | May 7, 1907 |
| 1,226,870 | Duryea | May 22, 1917 |
| 1,244,286 | Breinl | Oct. 23, 1917 |
| 1,297,296 | Jackson | Mar. 11, 1919 |
| 1,669,424 | Schneider | May 15, 1928 |
| 1,852,582 | Longacre | Apr. 5, 1932 |
| 1,987,974 | Richardson | Jan. 15, 1935 |
| 2,195,205 | Wineman | Mar. 26, 1940 |
| 2,197,455 | Volpin | Apr. 16, 1940 |

FOREIGN PATENTS

| Number | Country | Date |
|---|---|---|
| 390,531 | France | of 1908 |
| 501,720 | France | Feb. 4, 1920 |